UNITED STATES PATENT OFFICE.

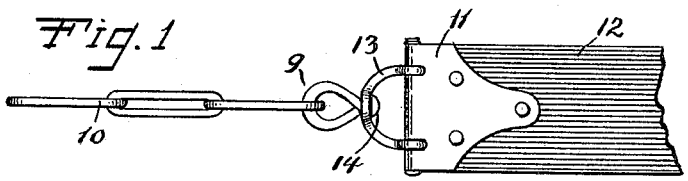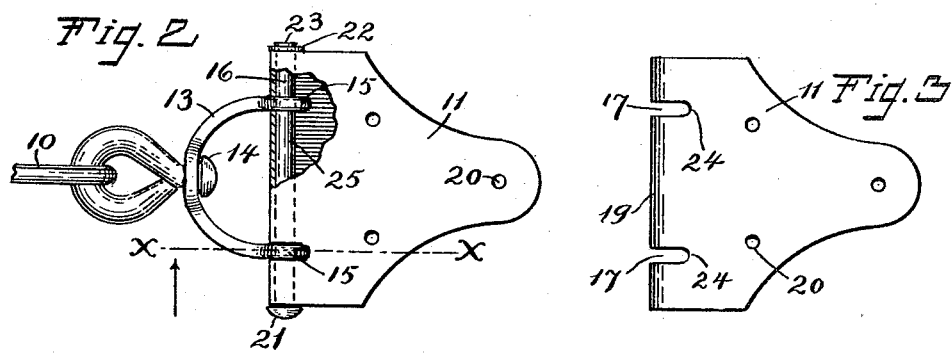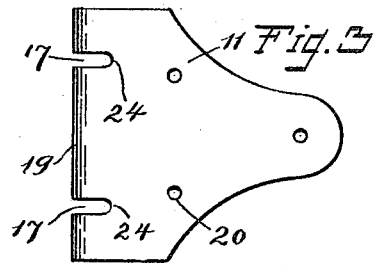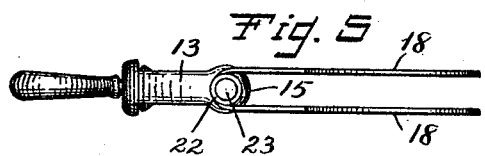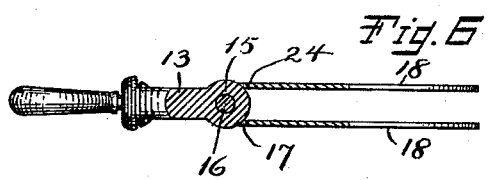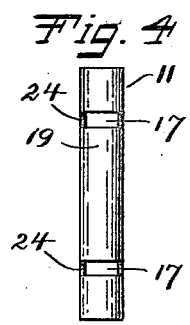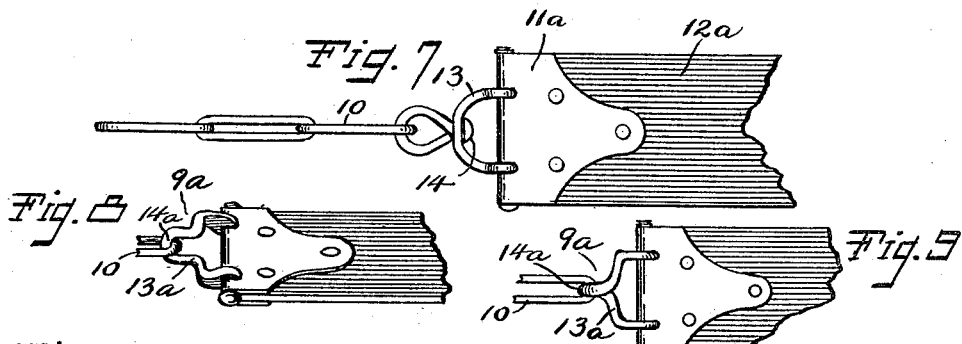

JACOB FREDERICK SCHOELLKOPF, OF DALLAS, TEXAS, ASSIGNOR TO NORTH & JUDD MANUFACTURING COMPANY, OF NEW BRITAIN, CONNECTICUT, A CORPORATION.

TOGGLE AND CLIP COMBINATION.

1,106,414.

Specification of Letters Patent. Patented Aug. 11, 1914.

Application filed May 7, 1913. Serial No. 766,075.

*To all whom it may concern:*

Be it known that I, JACOB FREDERICK SCHOELLKOPF, a citizen of the United States, residing at Dallas, in the county of Dallas and State of Texas, have invented certain new and useful Improvements in Toggle and Clip Combinations, of which the following is a specification.

My invention relates to improvements in toggle and clip combinations, and the object of my improvement is simplicity and economy in construction and convenience and efficiency in use.

In the accompanying drawing:—Figure 1 is a side elevation of my improved toggle and clip combination and part of a trace. Fig. 2 is a similar view on an enlarged scale, and in part broken out of the toggle and clip combination. Fig. 3 is a similar view of the clip. Fig. 4 is a rear elevation of the same. Fig. 5 is a plan view of the toggle and clip combination. Fig. 6 is a sectional view on the line $x\ x$ of Fig. 2. Fig. 7 is a view corresponding to Fig. 1 and on the same scale, showing a modification of the toggle and clip combination. Fig. 8 is a perspective view of a modification of my toggle and clip combination. Fig. 9 is a side elevation of the same. Fig. 10 is a plan view of the same.

My toggle and clip combination comprises a toggle 9 at one end having a chain 10 suitable for being hooked to the whiffletree in the usual manner and a clip 11 at the other end suitable for being secured to the trace 12, also in an ordinary manner, and the said toggle and clip are permanently connected together in a manner to be described.

The toggle 9 comprises the chain 10 and a yoke 13 connected at the apex of the yoke 13 by a swivel connection 14 which is also ordinary. Each of the two arms of the yoke 13 is provided at the inner end with an eye 15 having an opening that is fit for the pintle pin 16 and engaged therewith. The eyes 15 also fit in slots 17 in the clip 11. The clip 11 is formed of a strip of sheet metal which is doubled back upon itself so as to form two arms 18 suitably spread apart to receive between them the end of the trace 12 and to receive within the apex 19 the pintle pin 16. The clip arms 18 are provided with a plurality of holes 20 for rivets or other means for securing the trace 12. The apex portion 19 is also provided with slots 17 already mentioned, to admit the eyes 15 and while engaged with the pintle pin 16.

The pintle pin 16 has the body portion 25 extending along the apex 19 of the clip 11 and is held in position laterally by a head 21 at one end and a washer 22 at the other end held in place by passing over the extreme end 23.

In assembling my toggle and clip combination the eyes 15 are inserted in the slots 17 and then the pintle pin 16 is slipped along the apex portion 19 of the clip 11 and through the said eyes 15 while in position in the said slots 17, after which the washer 22 is placed on the free end of the pintle pin 16 and the extreme end 23 thereof is headed over. With the toggle and clip connected as described, in the case of a longitudinal pull on the clip 11 the pintle pin 16 engages with the apex portion 19 of the clip 11. The outer diameter of the eye 15 is appreciably in excess of the spread of the arms 18 of the clip 11 and the depth of the slot 17 is preferably such as to easily admit the said eye 15 and at the same time to limit the forward movement of the said eye in the slot by the engagement of the body wall of the eye 15 with the end wall 24 of the slot 17, as may be seen in Fig. 6. Accordingly, the eye 15 is positively positioned in the apex portion 19 both longitudinally and laterally and at the same time is free to swing pivotally on the pintle pin 16.

The permanent connection of the toggle and clip as described is of considerable convenience in use.

Furthermore, it will be noted that the engagement of the yoke 13 by means of the eyes 15 is along the body portion 25 of the pintle pin 16 and appreciably inward from the ends thereof. This is advantageous from a mechanical standpoint, and also permits of the use of one size yoke 13 with different sizes of clips. In Fig. 7 is shown a clip 11ᵃ and strap 12ᵃ of greater width than the clip 11 and strap 12 shown in Fig. 1 and connected to the same size yoke 13.

The toggle and clip as described are permanently connected, and by a hinge connection, and which permits of the use of the toggle and the clip that compose the same in the usual manner.

In the modification shown in Figs. 8, 9, and 10 the toggle 9ᵃ comprises in lieu of the yoke 13 and swivel connection 14 a cock-eye 13ᵃ having an eye 14ᵃ engaged with the chain 10, the arms of the said cock-eye 13ᵃ being twisted in the usual manner so that the opening in the said eye 14ᵃ is directed to conform to the direction of the pintle pin 16.

The advantages of the permanent connection of the toggle and clip mentioned above apply also to this form of toggle and clip combination.

As described the yoke of the toggle is of U shape, having arms appreciably spread apart having at one end portion, at the junction of the said arms, a flexible connection of some form for a chain, that is, either an eye or a swivel, and having at the other end portion, at the free ends of the said arms, a pair of parallel eyes for the pintle, fitting in the slots in the clip, the said slots being narrow in the axial direction of the pintle and a fairly good fit radially for the eyes, the latter being relatively thick walled radially.

I claim as my invention:—

A toggle and clip combination comprising at one end a yoke suitable for being connected to a chain and a clip for a trace at the other end, and a pintle pin connecting the said yoke and clip, the said clip being of flat U shape, having arms spaced apart suitably to house a trace therebetween, and having the said pintle pin positioned at the apex portion, the said yoke being of open U shape having arms of appreciable length and appreciably spread apart, and eyes at the ends of the said arms in alinement for the said pintle pin, and the said clip being of appreciably greater width than the spread of the arms of the said yoke and being provided with cross slots at the said apex portion to fit and to receive the said eyes.

JACOB FREDERICK SCHOELLKOPF.

Witnesses:
CHAS. BOLL,
CHAS. E. FRETZ.

Copies of this patent may be obtained for five cents each, by addressing the "Commissioner of Patents, Washington, D. C."